US012626428B2

(12) United States Patent
Yasui

(10) Patent No.: US 12,626,428 B2
(45) Date of Patent: May 12, 2026

(54) DRAWING DATA EXAMINATION METHOD FOR EXAMINING DRAWING DATA OF A FIGURE EXPRESSED BY A B-SPLINE CURVE, DRAWING METHOD, DRAWING APPARATUS, AND NON-TRANSITORY STORAGE MEDIUM

(71) Applicant: NuFlare Technology, Inc., Yokohama (JP)

(72) Inventor: Kenichi Yasui, Kawasaki (JP)

(73) Assignee: NuFlare Technology, Inc., Yokohama (JP)

( * ) Notice: Subject to any disclaimer, the term of this patent is extended or adjusted under 35 U.S.C. 154(b) by 73 days.

(21) Appl. No.: 18/668,406

(22) Filed: May 20, 2024

(65) Prior Publication Data

US 2025/0014239 A1 Jan. 9, 2025

(30) Foreign Application Priority Data

May 29, 2023 (JP) ................................. 2023-087886

(51) Int. Cl.
*G06T 11/23* (2026.01)

(52) U.S. Cl.
CPC ................................... *G06T 11/23* (2026.01)

(58) Field of Classification Search
None
See application file for complete search history.

(56) References Cited

U.S. PATENT DOCUMENTS 5,818,459 A * 10/1998 Kurumida ............. G06T 11/203
345/442
6,600,485 B1 * 7/2003 Yoshida .................. G06T 17/30
345/419
7,611,060 B2 11/2009 Wang et al.
(Continued)

FOREIGN PATENT DOCUMENTS

JP 2020-64911 A 4/2020
TW 202029270 A 8/2020
WO WO 2019/058782 A1 3/2019

OTHER PUBLICATIONS

Taiwanese Office Action issued Jul. 25, 2025 in Taiwanese Patent Application No. 113115430, 4 pgs.

*Primary Examiner* — Michael J Cobb
(74) *Attorney, Agent, or Firm* — Oblon, McClelland, Maier & Neustadt, L.L.P.

(57) ABSTRACT

A drawing data examination method acquires coordinates representing the positions of a first control point group forming a B-spline curve; calculates a B-spline curve intersection ratio; converts the coordinates of the first control point group into the coordinates of a second control point group of a Bezier curve when the B-spline curve intersection ratio exceeds a threshold value, and determines whether the figure after the coordinate conversion has an intersection; and determines whether the figure of the drawing data has an intersection based on the first control point group when the B-spline curve intersection ratio is equal to or smaller than the threshold value, and converts the coordinates of the first control point group into the coordinates of the second control point group when the figure of the drawing data has an intersection, and determines whether the figure after the coordinate conversion has an intersection.

5 Claims, 11 Drawing Sheets

(56) References Cited

U.S. PATENT DOCUMENTS

| | | |
|---|---|---|
| 11,150,543 B2 | 10/2021 | Ye et al. |
| 11,327,408 B2 | 5/2022 | Yasui et al. |
| 2020/0117095 A1 * | 4/2020 | Yasui .................. H01J 37/3026 |

* cited by examiner

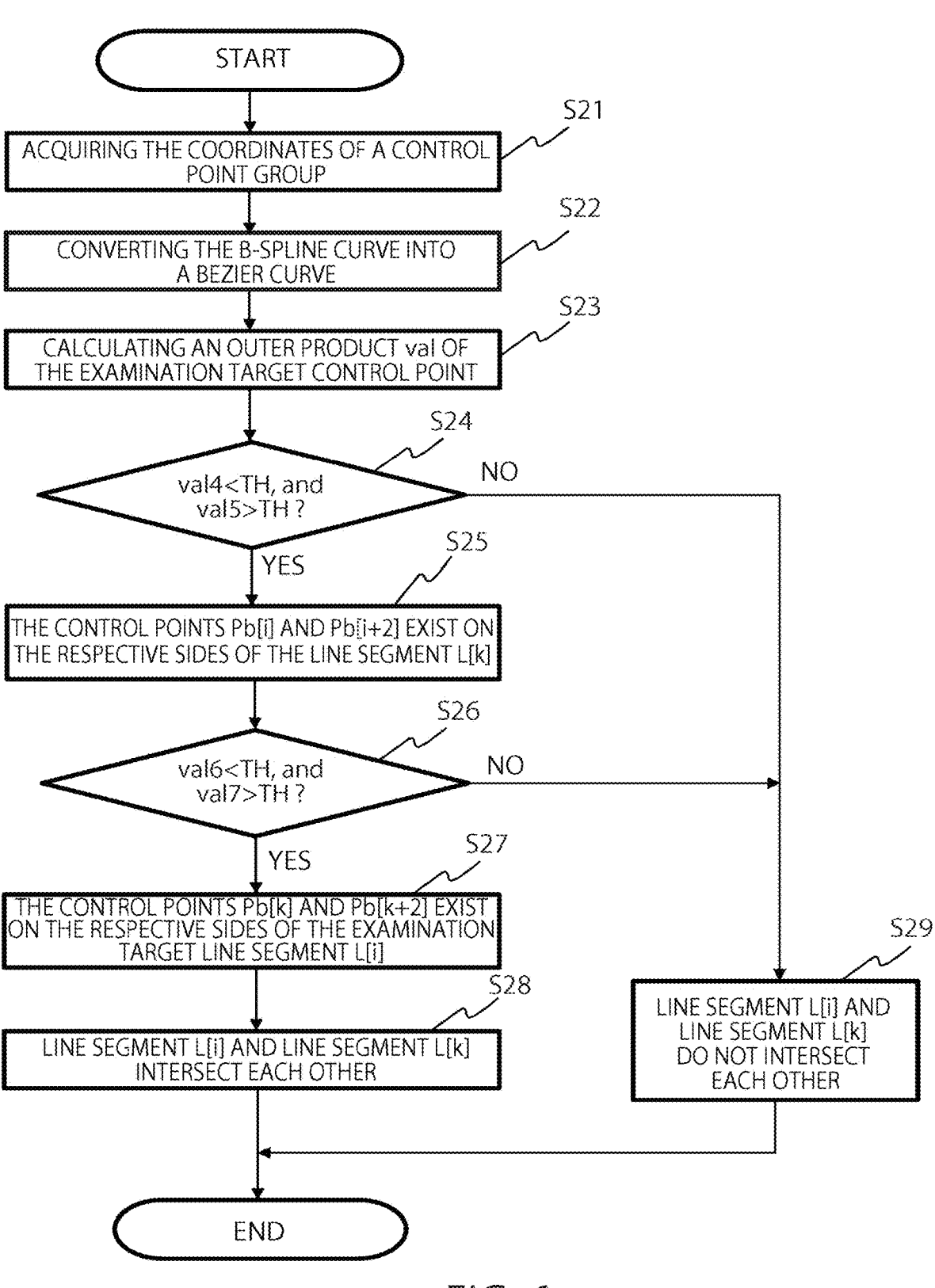

START

ACQUIRING THE COORDINATES OF A CONTROL POINT GROUP — S21

CONVERTING THE B-SPLINE CURVE INTO A BEZIER CURVE — S22

CALCULATING AN OUTER PRODUCT val OF THE EXAMINATION TARGET CONTROL POINT — S23

S24
val4<TH, and val5>TH ? — NO

YES

THE CONTROL POINTS Pb[i] AND Pb[i+2] EXIST ON THE RESPECTIVE SIDES OF THE LINE SEGMENT L[k] — S25

S26
val6<TH, and val7>TH ? — NO

YES

THE CONTROL POINTS Pb[k] AND Pb[k+2] EXIST ON THE RESPECTIVE SIDES OF THE EXAMINATION TARGET LINE SEGMENT L[i] — S27

LINE SEGMENT L[i] AND LINE SEGMENT L[k] INTERSECT EACH OTHER — S28

LINE SEGMENT L[i] AND LINE SEGMENT L[k] DO NOT INTERSECT EACH OTHER — S29

END

FIG. 6

DRAWING DATA EXAMINATION METHOD FOR EXAMINING DRAWING DATA OF A FIGURE EXPRESSED BY A B-SPLINE CURVE, DRAWING METHOD, DRAWING APPARATUS, AND NON-TRANSITORY STORAGE MEDIUM

CROSS-REFERENCE TO RELATED APPLICATIONS

This application is based upon and claims the benefit of priority from Japanese Patent Application No. 2023-087886, filed on May 29, 2023; the entire contents of which are incorporated herein by reference.

FIELD

The present invention relates to a drawing data examination method, a drawing method, a drawing apparatus, and a non-transitory storage medium.

BACKGROUND

For example, a multibeam drawing apparatus configured to emit a large number of beams at a time by using multiple beams is known as an electron beam drawing apparatus. The multibeam drawing apparatus performs electron beam drawing based on drawing data. In a case where the drawing data includes a curved figure, the curved figure is approximated to a B-spline curve as one of parameter curves for mask data amount reduction.

For efficiency of rasterization processing, it is assumed that a curved figure produced with a B-spline curve does not have an intersection within the same figure. Thus, it is needed to examine whether an intersection place exists inside a curved figure of drawing data.

In a case where drawing data including a curved figure produced with a B-spline curve is examined, it is potentially determined that the drawing data fails the examination even in a situation where the curve does not have an intersection at all, depending on the shape of the drawing data.

BRIEF DESCRIPTION OF THE DRAWINGS

FIG. 6 is a flowchart for describing another example of the procedure of the drawing data examination method;

DETAILED DESCRIPTION

Figure 1:
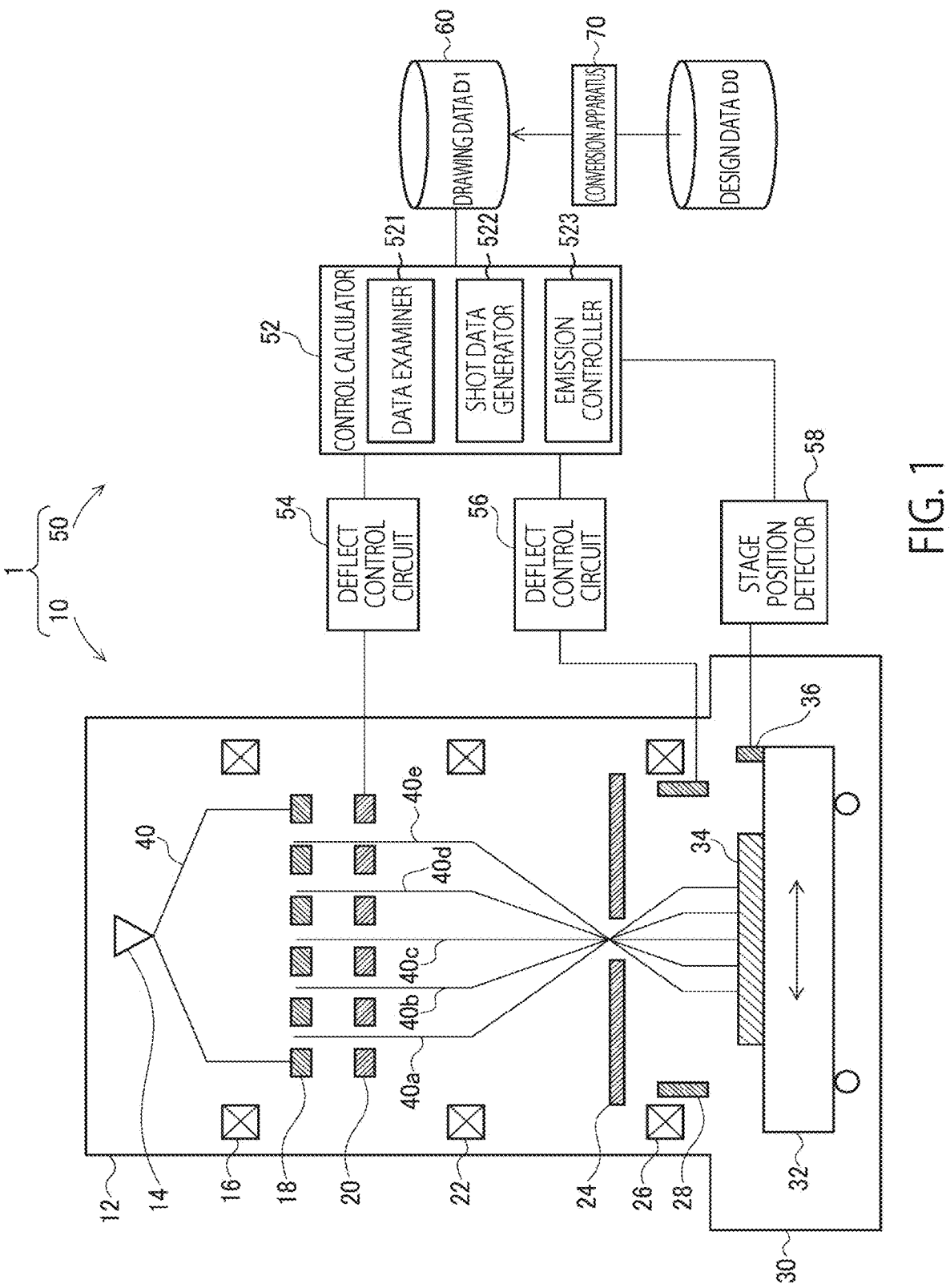
FIG. 1 is a schematic diagram of a multi-charged particle beam drawing apparatus according to a first embodiment.

Embodiments will now be explained with reference to the accompanying drawings. The present invention is not limited to the embodiments.

A drawing data examination method according to an aspect of the present invention is a drawing data examination method for examining drawing data of a figure expressed by a B-spline curve, the drawing data being used by a charged particle beam drawing apparatus. The examination method acquires coordinates representing the positions of a first control point group forming a B-spline curve; calculates, in a process of examination, a B-spline curve intersection ratio indicating a ratio of the number of figures expressed by a B-spline curve having an intersection place relative to the total number of figures; converts the coordinates of the first control point group into coordinates of a second control point group of a Bezier curve in a case where the B-spline curve intersection ratio exceeds a threshold value, and determines whether the figure after the coordinate conversion has an intersection; and determines whether the figure has an intersection based on the first control point group in a case where the B-spline curve intersection ratio is equal to or smaller than the threshold value, and converts the coordinates of the first control point group into the coordinates of the second control point group in a case where the figure has an intersection, and determines whether the figure after the coordinate conversion has an intersection.

First Embodiment

FIG. 1 is a schematic diagram of a multi-charged particle beam drawing apparatus according to a first embodiment. In the present embodiment, a configuration in which an electron beam is used as an example of a charged particle beam will be described below. However, a charged particle beam is not limited to an electron beam but may be another charged particle beam such as an ion beam. Moreover, a drawing apparatus is of a multibeam scheme in the present embodiment but may be of a single beam scheme.

A drawing apparatus 1 according to the present embodiment, which is illustrated in FIG. 1 includes a drawer 10 configured to draw a desired pattern by irradiating a target object such as a mask or a wafer with an electron beam, and a controller 50 configured to control drawing operation of the drawer 10. The drawer 10 includes an electron beam lens barrel 12 and a drawing chamber 30.

An electron gun 14, an illumination lens 16, a shaping aperture array member 18, a blanking aperture array plate 20, a reducing lens 22, a restricting aperture member 24, an objective lens 26, and a deflector 28 are disposed in the electron beam lens barrel 12. An XY stage 32 is disposed in the drawing chamber 30. A mask blank 34 that is a drawing target substrate is placed on the XY stage 32. The target object is, for example, a wafer, or an exposure mask with which a pattern is transferred onto a wafer by using a reduced projection type exposure device or an extreme ultraviolet exposure device, such as a stepper or a scanner, with an excimer laser as a light source. The drawing target substrate is, for example, a mask on which a pattern is already formed. For example, a Levenson type mask needs two times of drawing, and thus the second pattern is drawn on a mask fabricated by the first drawing in some cases. In addition, a mirror 36 for position measurement of the XY stage 32 is disposed on the XY stage 32.

The controller 50 includes a control calculator 52, deflect control circuits 54 and 56, and a stage position detector 58. The control calculator 52, the deflect control circuits 54 and 56, and the stage position detector 58 are connected to each other through a bus.

An electron beam 40 discharged from the electron gun 14 is substantially vertically incident on the entire shaping aperture array member 18 through the illumination lens 16. The shaping aperture array member 18 is formed with holes (opening parts) in a matrix of rows and columns at a predetermined array pitch. The electron beam 40 is incident on a region including all holes of the shaping aperture array member 18. As part of the electron beam 40 passes through each of the plurality of holes, multiple beams 40a to 40e as illustrated in FIG. 1 are formed.

The blanking aperture array plate 20 is formed with pass holes in accordance with disposition positions of the holes of the shaping aperture array member 18, and a blanker made of a pair of electrodes is disposed at each pass hole. The electron beams 40a to 40e passing through the pass holes are each independently deflected by voltage applied by the corresponding blanker. Blanking control is performed by the deflection. In this manner, the plurality of blankers each perform blanking deflection of the corresponding beam among the multiple beams passing through the plurality of holes of the shaping aperture array member 18.

The multiple beams 40a to 40e having passed through the blanking aperture array plate 20 are reduced by the reducing lens 22 and travel toward a central hole formed at the restricting aperture member 24. An electron beam deflected by a blanker of the blanking aperture array plate 20 is shifted from the central hole of the restricting aperture member 24 and shielded by the restricting aperture member 24. An electron beam not deflected by a blanker of the blanking aperture array plate 20 passes through the central hole of the restricting aperture member 24.

In this manner, the restricting aperture member 24 shields any beam deflected to become a beam "OFF" state by a blanker of the blanking aperture array plate 20. Beams having passed through the restricting aperture member 24 between "beam ON" and "beam OFF" are beams of one shot. The multiple beams 40a to 40e having passed through the restricting aperture member 24 are focused through the objective lens 26 and form a pattern image at a desired reduction ratio. The beams (all of the multiple beams) having passed through the restricting aperture member 24 are collectively deflected into the same direction by the deflector 28 and each incident on the corresponding incidence position on the mask blank 34.

Such control is performed by the deflector 28 that the incidence position of a beam follows movement of the XY stage 32 when the XY stage 32 is continuously moving. The XY stage 32 is moved by a stage controller (not illustrated), and the position of the XY stage 32 is detected by the stage position detector 58.

Multiple beams emitted at a time are ideally arranged at a pitch calculated by multiplying the array pitch of the plurality of holes of the shaping aperture array member 18 by the above-described desired reduction ratio. The drawing apparatus performs drawing operation in a raster scanning scheme of continuously emitting shot beams in order, and in a case where a desired pattern is drawn, necessary beams are controlled to "beam ON" by blanking control in accordance with the pattern. When the XY stage 32 is continuously moving, the incidence position of a beam is controlled by the deflector 28 to follow movement of the XY stage 32.

As illustrated in FIG. 1, the control calculator 52 includes a data examiner 521, a shot data generator 522, and an emission controller 523. The data examiner 521 examines drawing data D1 read from a storage device 60. The method of the examination by the data examiner 521 will be described later.

In a case where the drawing data D1 passes the examination by the data examiner 521, the shot data generator 522 generates shot data unique to the device by performing data conversion processing at a plurality of stages on the drawing data D1. The shot data defines, for example, an emission amount and an incidence position coordinate of each shot. For example, the shot data generator 522 allocates a figure pattern defined in the drawing data D1 to corresponding pixels. Then, the shot data generator 522 calculates, for each pixel, area density of the figure pattern to be disposed.

The emission controller 523 calculates, for each pixel, an emission amount of electron beams per shot. For example, an emission amount proportional to the area density of each pixel is calculated and corrected with taken into account dimension variation due to a proximity effect, a color cast effect, a loading effect, and the like.

The emission controller 523 outputs the emission amount of each shot, which is calculated based on the shot data, to the deflect control circuit 54. The deflect control circuit 54 calculates an emission time t by dividing the input emission amount by current density. Then, when performing the corresponding shot, the deflect control circuit 54 applies deflection voltage to the corresponding blanker of the blanking aperture array plate 20 so that the blanker becomes "beam ON" for the emission time t.

The emission controller 523 also outputs deflection position data to the deflect control circuit 56 so that each beam is deflected to a position (coordinate) indicated by the shot data. The deflect control circuit 56 calculates a deflection amount and applies deflection voltage to the deflector 28. Accordingly, multiple beams that are shot this time are collectively deflected.

The drawing data D1, which is an examination target of the data examiner 521, will be described below. The drawing data D1 is generated based on design data (CAD data) D0 at a conversion apparatus 70. The design data D0 is, for example, arrangement data that designs arrangement of semiconductor integrated circuits.

The design data D0 includes a curved figure. For the curved figure, the conversion apparatus 70 calculates a plurality of control points for expressing (parametric curve expression) a B-spline curve and calculates coordinate positions of the control points. The conversion apparatus 70 calculates, for each control point, displacement from any adjacent control point in the drawing data D1.

Figure 2:
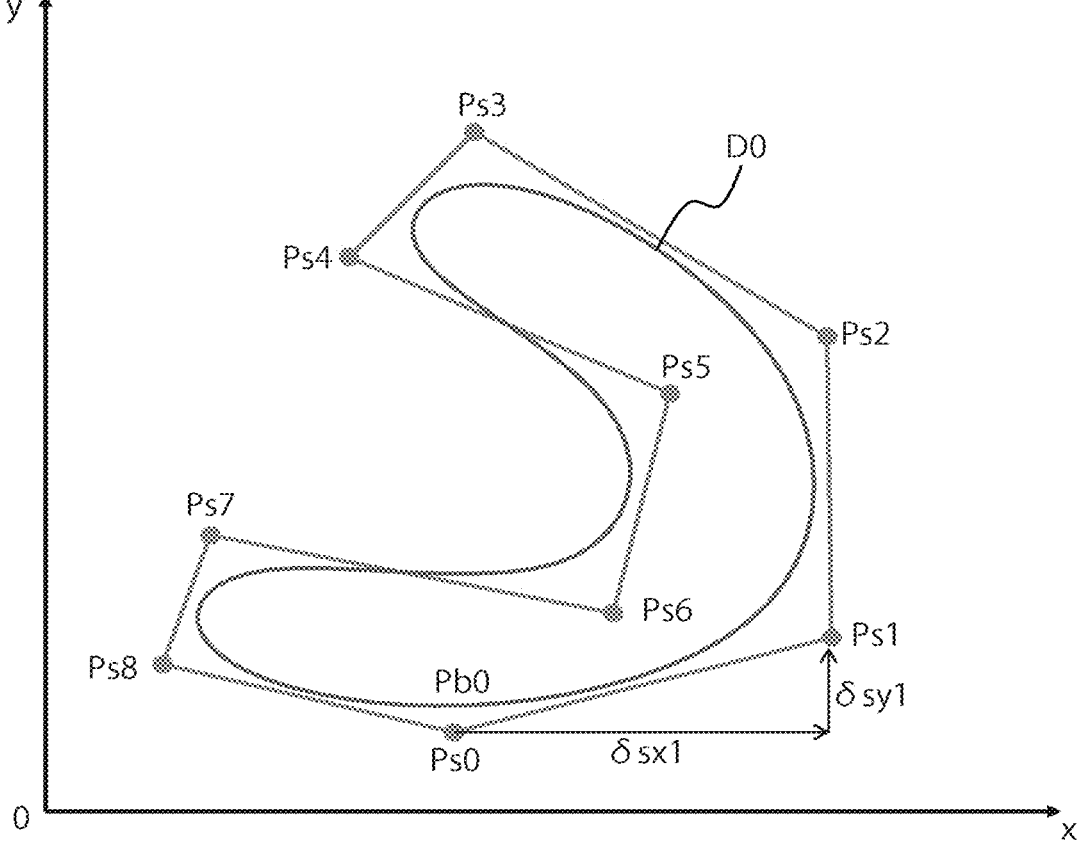
FIG. 2 is a diagram illustrating an example of design data D0.

FIG. 2 is a diagram illustrating an example of the design data D0. The design data D0 is formed of a closed curve. The closed curve is approximated to a B-spline curve formed of nine control points Ps0 to Ps8. The conversion apparatus 70 calculates the control points Ps0 to Ps8 with which the closed curve is approximated. In the present embodiment, the control points Ps0 to Ps8 are sequentially provided with control point numbers in accordance with positions on the drawing data D1. The conversion apparatus 70 generates the drawing data D1 by expressing the coordinate position of a control point as a displacement from any other control point adjacent to the control point in the drawing data D1.

The figure of the drawing data D1 is not limited to a closed curve. For example, the drawing data D1 may include a curved figure and a polygonal figure. The drawing data D1 may have a hole in an outer peripheral part surrounded by a closed curve. The hole is an opening part surrounded by a closed curve or straight lines.

For example, in FIG. 2, the coordinate (xs0, ys0) of the control point Ps0 is defined as a figure disposition origin of the curved figure. The coordinate position of the control point Ps1 adjacent to the control point Ps0 on the drawing data D1 and having the next control point number is defined by an x-directional displacement δsx1 and a y-directional displacement δsy1 with respect to the control point Ps0. Similarly to the coordinate position of the control point Ps1, the coordinate positions of the control points Ps2 to Ps8 are each defined by x-directional and y-directional displacements with respect to the control point of the previous control point number on the drawing data D1. The conversion apparatus 70 defines the x and y coordinates of the control points Ps0 to Ps8 with integers.

The data examiner 521 examines the drawing data D1 approximated to a B-spline curve. An example of the method of the examination by the data examiner 521 will be described below.

Figure 3:
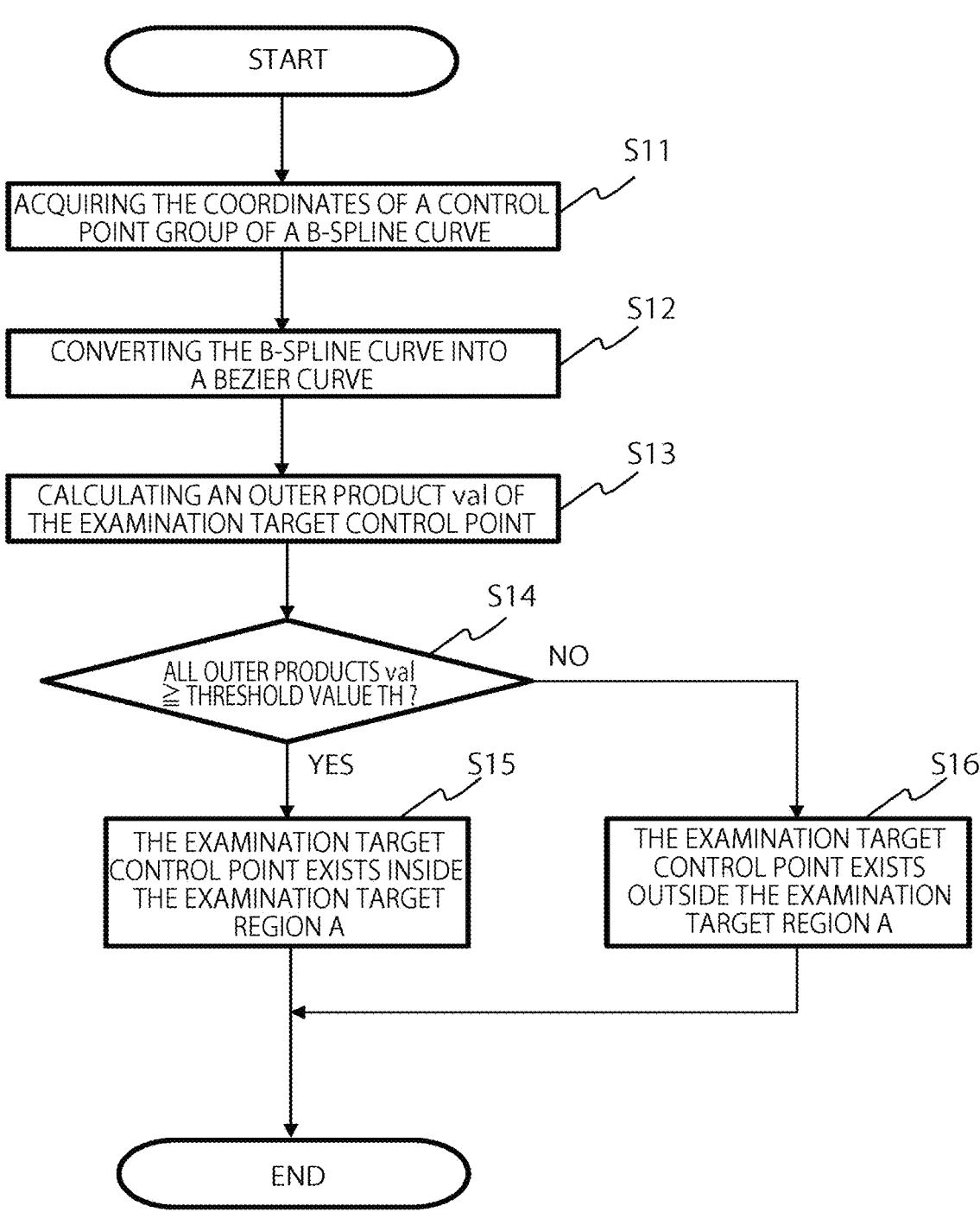
FIG. 3 is a flowchart for describing an example of the procedure of a drawing data examination method.

FIG. 3 is a flowchart for describing an example of the procedure of a method for examining the drawing data D1. First, the data examiner 521 acquires, from the storage device 60, the coordinates of a control point group (first control point group) including a plurality of control points Ps of the drawing data D1 (step S11).

Subsequently, the data examiner 521 converts the B-spline curve into a Bezier curve (step S12). At step S12, for example, in a case where the order p of the B-spline curve is two, the data examiner 521 converts the coordinate of the control point Ps0, which is the figure disposition origin of the B-spline curve, into the coordinate of a control point Pb0, which is the figure disposition origin of the Bezier curve, by using a conversion matrix written in Expression (1) below.

$$Pb0 = \frac{1}{2}\begin{bmatrix} 1 & 1 & 0 \\ 0 & 2 & 0 \\ 0 & 1 & 1 \end{bmatrix} Ps0 \tag{1}$$

In a case where the curve order p is three, the data examiner 521 converts the coordinate of the control point Ps0 of the B-spline curve into the coordinate of the control point Pb0 of the Bezier curve by using a conversion matrix written in Expression (2) below.

$$Pb0 = \frac{1}{6}\begin{bmatrix} 1 & 4 & 1 & 0 \\ 0 & 4 & 2 & 0 \\ 0 & 2 & 4 & 0 \\ 0 & 1 & 4 & 1 \end{bmatrix} Ps0 \tag{2}$$

As described above, a conversion matrix for converting the B-spline curve into the Bezier curve is set in advance in accordance with the order of the B-spline curve. The coordinate position of a control point Pb1 adjacent to the control point Pb0 on the Bezier curve and having the next control point number is defined by an x-directional displacement δbx1 and a y-directional displacement δby1 with respect to the control point Pb0. Similarly to a control point Ps of the B-spline curve, a control point Pb (second control point) of the Bezier curve is defined by x-directional and y-directional displacements with respect to the control point of the previous control point number on the Bezier curve. In this manner, the B-spline curve is converted into the Bezier curve.

Figure 4:
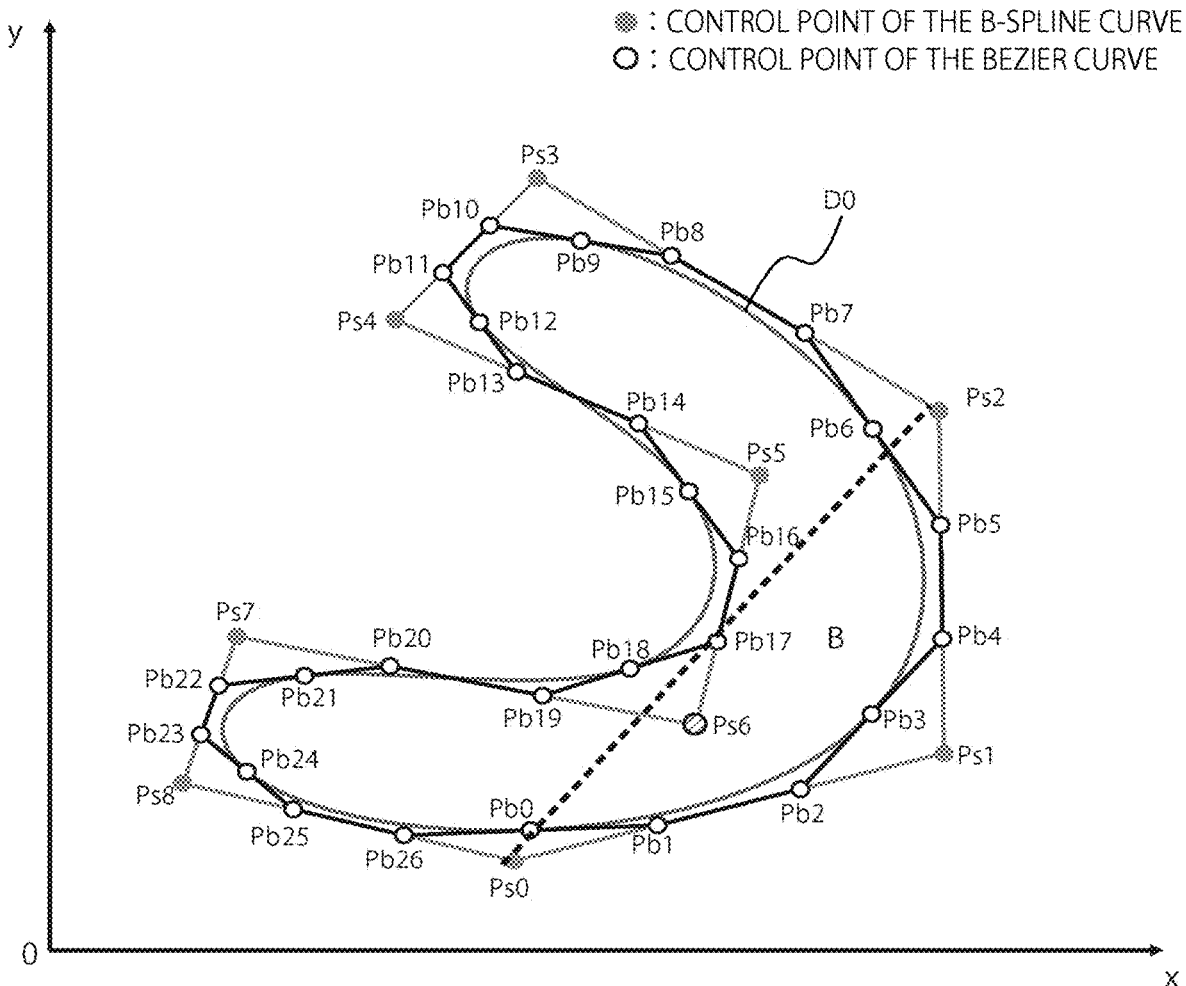
FIG. 4 is a diagram illustrating an example of control points of a B-spline curve and a Bezier curve.

FIG. 4 is a diagram illustrating an example of control points of the B-spline curve and the Bezier curve. In the example illustrated in FIG. 4, the B-spline curve formed of the nine control points Ps0 to Ps8 is converted into the Bezier curve formed of 27 control points Pb0 to Pb26. In this example, the amount of displacement between control points of the Bezier curve, in other words, the linear distance of a straight line connecting the control points is shorter than the linear distance between control points of the B-spline curve. Accordingly, the number of control points of the Bezier curve is larger than the number of control points of the B-spline curve.

After conversion processing from the B-spline curve to the Bezier curve ends, the data examiner 521 calculates an outer product val of an examination target control point (step S13). The data examiner 521 examines whether the examination target control point exists inside an examination target region based on a result of outer product calculation processing on the coordinate of a control point Pb of the Bezier curve. The examination target region is a region surrounded by line segments connecting three or more control points on the Bezier curve with straight lines. The examination target control point is a control point different from the control points forming the examination target region. The following describes operation at step S13 in detail.

Figure 5:
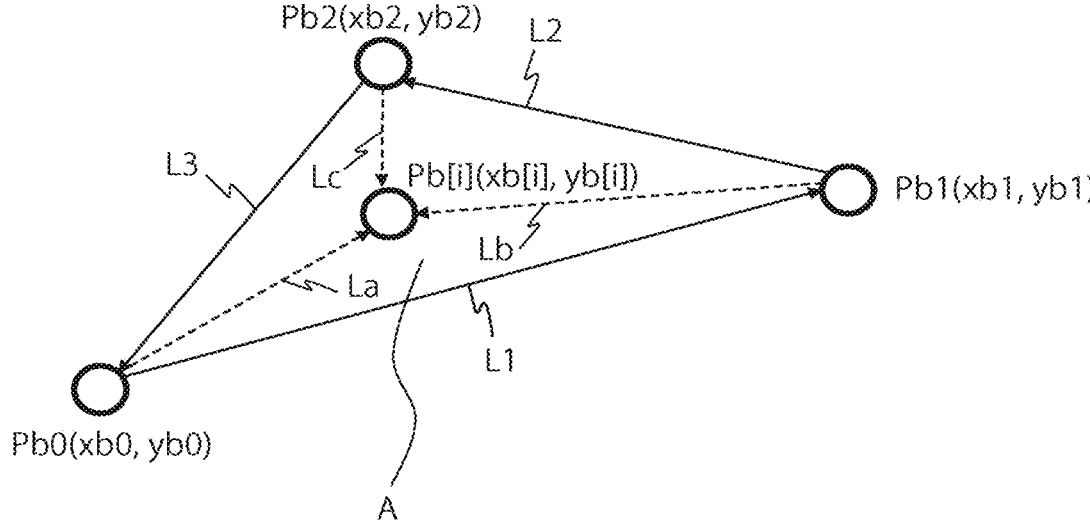
FIG. 5 is a diagram for describing an example of the drawing data examination method.

FIG. 5 is a diagram for describing an example of the method for examining the drawing data D1 based on the Bezier curve. At step S13, for example, the data examiner 521 sets, as a minimum examination target region A, a triangle connecting the control point Pb0, the control point Pb1, and the control point Pb2 with line segments (vectors) L1 to L3 as illustrated in FIG. 5. In this case, the data examiner 521 sets, as the examination target control point, a control point Pb[i] (xb[i], yb[i]) (i is a control point number) on the Bezier curve, which is different from the control point Pb0, the control point Pb1, and the control point Pb2.

The data examiner 521 calculates the outer product val of each examination target control point for the line segments (vector) L1 to L3 surrounding the examination target region A. Specifically, the data examiner 521 calculates an outer product val1 by using Expression (3) below.

$$val1 = xb1 \times yb[i] - yb1 \times xb[i] \tag{3}$$

The data examiner 521 converts the coordinate (xb0, yb0) of the control point Pb0 into the origin (0, 0) and calculates, as the outer product val1, the vector outer product of a line segment (vector) La connecting the control point Pb0 to the control point Pb[i] with a straight line and the line segment (vector) L1 connecting the control point Pb0 to the control point Pb1 with a straight line. In this case, the data examiner 521 converts the coordinate (xb1, yb1) of the control point Pb1 and the coordinate (xb[i], yb[i]) of the control point Pb[i] into coordinates in a coordinate system having an origin at the coordinate of the control point Pb0.

Subsequently, the data examiner 521 calculates an outer product val2 by using Expression (4) below.

$$val2 = xb2 \times yb[i] - yb2 \times xb[i] \tag{4}$$

The data examiner 521 converts the coordinate (xb1, yb1) of the control point Pb1 into the origin (0, 0) and calculates, as the outer product val2, the vector outer product of a line segment (vector) Lb connecting the control point Pb1 to the control point Pb[i] with a straight line and the line segment (vector) L2 connecting the control point Pb1 to the control point Pb2 with a straight line. In this case, the data examiner 521 converts the coordinate (xb2, yb2) of the control point Pb2 and the coordinate (xb[i], yb[i]) of the control point Pb[i] into coordinates in a coordinate system having an origin at the coordinate of the control point Pb1.

Lastly, the data examiner 521 calculates an outer product val3 by using Expression (5) below.

$$val3 = xb0 \times yb[i] - yn0 \times xb[i] \qquad (5)$$

The data examiner 521 converts the coordinate (xb2, yb2) of the control point Pb2 into the origin (0, 0) and calculates, as the outer product val3, the vector outer product of a line segment (vector) Lc connecting the control point Pb2 to the control point Pb[i] with a straight line and the line segment (vector) L3 connecting the control point Pb2 to the control point Pb0 with a straight line. In this case, the data examiner 521 converts the coordinate (xb0, yb0) of the control point Pb0 and the coordinate (xb[i], yb[i]) of the control point Pb[i] into coordinates in a coordinate system having an origin at the coordinate of the control point Pb2.

At step S13, the outer products val with the line segments (vector) L1 to L3 are calculated for the remaining control points by using the formulae as described above.

After the calculation of the outer products val, the data examiner 521 compares the values of all outer products val with a threshold value TH (step S14). In the present embodiment, since the coordinate of a control point P is converted into the origin when the outer product val thereof is calculated, the threshold value TH is set to zero.

For example, in a case of the outer product val1≥the threshold value TH, the control point Pb[i] is positioned on the left side of the line segment (vector) L1 or on the line segment (vector) L1. In a case of the outer product val1<the threshold value TH, the control point Pb[i] is positioned on the right side of the line segment (vector) L1.

In a case of the outer product val2≥the threshold value TH, the control point Pb[i] is positioned on the left side of the line segment (vector) L2 or on the line segment (vector) L2. In a case of the outer product val2<the threshold value TH, the control point Pb[i] is positioned on the right side of the line segment (vector) L2.

In a case of the outer product val3≥the threshold value TH, the control point Pb[i] is positioned on the left side of the line segment (vector) L3 or on the line segment (vector) L3. In a case of the outer product val3<the threshold value TH, the control point Pb[i] is positioned on the right side of the line segment (vector) L3.

In a case where all outer products val1 to val3 are equal to or larger than the threshold value TH as a result of the comparison of the outer products val1 to val3 with the threshold value TH as described above, the control point Pb[i] is positioned on the left side of the line segments (vector) L1 to L3 or on either line segment. Thus, the data examiner 521 determines that the control point Pb[i] exists inside the examination target region A surrounded by the line segments (vector) L1 to L3 (step S15). In this case, the control point Pb[i] is regarded as a violation control point and the drawing data D1 fails the examination.

On the other hand, in a case where any one of the outer products val1 to val3 is smaller than the threshold value TH, the data examiner 521 determines that the control point Pb[i] exists outside the examination target region A (step S16). In this case, the control point Pb[i] is regarded as a passing control point. In a case where all examination target control points are passing control points, the drawing data D1 passes the examination.

After the examination of whether a control point exists inside the examination target region A ends as described above, the data examiner 521 sets, as the next examination target region to the examination target region A, a triangle connecting the control points Ps1, Ps2, and Ps3 with straight lines. Then, the data examiner 521 examines whether an examination target control point exists inside the set examination target region as in the examination of the examination target region A. In this manner, each time an examination target region is set, the data examiner 521 examines whether an examination target control point exists inside the examination target region.

Comparative Example

A comparative example will be described below with reference to FIG. 4. In the present comparative example, the above-described method for examining the drawing data D1 is applied to the B-spline curve.

In the present comparative example, first, the data examiner 521 sets the control points Ps0, Ps1, and Ps2 of the B-spline curve as an examination target region B and sets the control point Ps6 as an examination target control point. Subsequently, the data examiner 521 calculates the outer product val using the coordinate of each control point as in step 13 described above. Subsequently, the data examiner 521 determines whether the drawing data D1 passes the examination based on a result of comparison of the outer product val with the threshold value TH as in steps S14 to S16 described above.

In the present comparative example, the control point Ps6 exists inside the examination target region B surrounded by line segments connecting the control points Ps0 to Ps2 with straight lines as illustrated in FIG. 4. Thus, it is determined that the drawing data D1 fails the examination although the curve formed by the control points Ps0 to Ps8 does not have an intersection.

However, in the present embodiment described above, the data examiner 521 examines the drawing data D1 based on the Bezier curve, which has a lower data compression ratio than the B-spline curve. Accordingly, the data examiner 521 can examine the drawing data D1, which is more approximate to the design data D0, and the drawing data D1 is less likely to have constraints on the shape of a curved figure at examination. Thus, according to the present embodiment, the drawing data D1 can be accurately examined with relaxed constraints on the shape of a curved figure included in the drawing data.

In the present embodiment, the data examiner 521 determines an examination result of the drawing data D1 based on whether an examination target control point exists inside the examination target region, but the examination of the drawing data D1 is not limited to this method and may be performed by another method.

The following describes, as another method for examining the drawing data D1, an examination method for avoiding intersection of two line segments connecting control points of the Bezier curve with straight lines.

Figure 7:
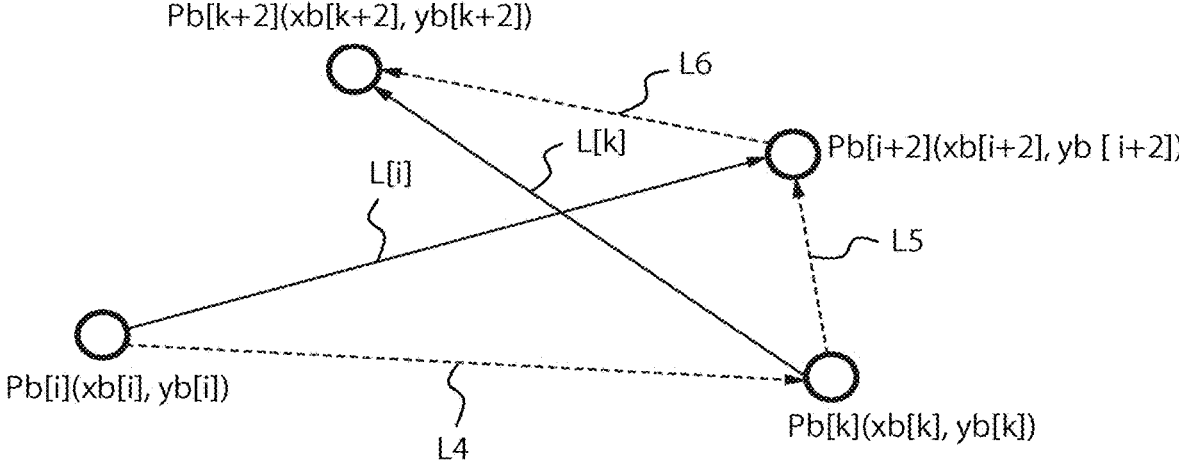
FIG. 7 is a diagram for describing the drawing data examination method performed in accordance with the flowchart illustrated in FIG. 6.

FIG. 6 is a flowchart for describing another example of the procedure of the method for examining the drawing data D1. FIG. 7 is a diagram for describing the method for examining the drawing data D1, which is performed in accordance with the flowchart illustrated in FIG. 6.

In the examination method described with reference to FIGS. 6 and 7, the data examiner 521 examines whether two examination target line segments intersect each other under a condition with the Bezier curve order p=2.

First, the data examiner 521 acquires, from the conversion apparatus 70, the coordinates of a control point group consisting of the control points Ps0 to Ps8 of the B-spline curve included in the drawing data D1 (step S21).

Subsequently, the data examiner 521 converts the B-spline curve into a Bezier curve (step S22). The data examiner 521 converts the coordinate of a control point Ps of the B-spline curve into the coordinate of a control point Pb of the Bezier curve by using the conversion matrix written in Expression (1) above.

Subsequently, the data examiner 521 calculates the outer product val of any examination target control point (step S23). At step S23, the data examiner 521 sets two control points adjacent to each other on the Bezier curve as examination target control points. The following describes a case where, as illustrated in FIG. 7, the data examiner 521 sets the control point Pb[i] (xb[i], yb[i]) and a control point Pb[k] (xb[k], yb[k]) (k!=i+1) as examination target control points. In this case, the data examiner 521 examines whether an examination target line segment (vector) L[i] and an examination target line segment (vector) L[k] intersect each other by calculating the outer products val of the examination target control points.

The examination target line segment (vector) L[i] is a line segment connecting, with a straight line, the control point Pb[i] to a control point Pb[i+2], which is apart from the control point Pb[i] with one control point number i therebetween. The examination target line segment (vector) L[k] is a line segment connecting, with a straight line, the control point Pb[k] to a control point Pb[k+2], which is apart from the control point Pb[k] with one control point number k therebetween.

To examine whether the examination target line segments (vectors) L[i] and L[k] intersect each other, the data examiner 521 calculates an outer product val4 of the control point Pb[i] for the examination target line segment (vector) L[k] by using Expression (6) below and calculates an outer product val5 of the control point Pb[i+2] for the examination target line segment (vector) L[k] by using Expression (7) below.

$$val4 = xb[k+2] \times yb[i] - xb[k+2] \times xb[i] \qquad (6)$$

$$val5 = xb[k+2] \times yb[i+2] - yb[k+2] \times xb[i+2] \qquad (7)$$

When calculating the outer product val4, the data examiner 521 converts the coordinate (xb[k], yb[k]) of the control point Pb[k] into the origin (0, 0) and calculates, as the outer product val4, the vector outer product of the examination target line segment (vector) L[k] and a line segment (vector) L4 connecting the control point Pb[k] to the control point Pb[i] with a straight line. In this case, the data examiner 521 converts the coordinate (xb[i], yb[i]) of the control point Pb[i] and the coordinate (xb[k+2], yb[k+2]) of the control point Pb[k+2] into coordinates in a coordinate system having an origin at the coordinate of the control point Pb[k].

When calculating the outer product val5, as in the calculation of the outer product val4, the data examiner 521 converts the coordinate (xb[k], yb[k]) of the control point Pb[k] into the origin (0, 0) and calculates, as the outer product val5, the vector outer product of the examination target line segment (vector) L[k] and a line segment (vector) L5 connecting the control point Pb[k] to the control point Pb[i+2] with a straight line. In this case as well, the data examiner 521 converts the coordinate (xb[i+2], yb[i+2]) of the control point Pb[i+2] and the coordinate (xb[k+2], yb[k+2]) of the control point Pb[k+2] into coordinates in a coordinate system having an origin at the coordinate of the control point Pb[k].

Subsequently, the data examiner 521 calculates an outer product val6 of the control point Pb[k] for the examination target line segment (vector) L[i] by using Expression (8) below and calculates an outer product val7 of the control point Pb[k+2] for the examination target line segment (vector) L[i] by using Expression (9) below.

$$val6 = xb[i] \times yb[k] - yb[i] \times xb[k] \qquad (8)$$

$$val7 = xb[i] \times yb[k+2] - yb[i] \times xb[k+2] \qquad (9)$$

When calculating the outer product val6, the data examiner 521 converts the coordinate (xb[i+2], yb[i+2]) of the control point Pb[i+2] into the origin (0, 0) and calculates, as the outer product val6, the vector outer product of the examination target line segment (vector) L[i] and the line segment (vector) L5. In this case, the data examiner 521 converts the coordinate (xb[i], yb[i]) of the control point Pb[i] and the coordinate (xb[k], yb[k]) of the control point Pb[k] into coordinates in a coordinate system having an origin at the coordinate of the control point Pb[i+2].

When calculating the outer product val7, as in the calculation of the outer product val6, the data examiner 521 converts the coordinate (xb[i+2], yb[i+2]) of the control point Pb[i+2] into the origin (0, 0) and calculates, as the outer product val7, the vector outer product of the examination target line segment (vector) L[i] and a line segment (vector) L6 connecting the control point Pb[i+2] to the control point Pb[k+2] with a straight line. In this case as well, the data examiner 521 converts the coordinate (xb[i], yb[i]) of the control point Pb[i] and the coordinate (xb[k+2], yb[k+2]) of the control point Pb[k+2] into coordinates in a coordinate system having an origin at the coordinate of the control point Pb[i+2].

After the calculation of the outer products val4 to val7, the data examiner 521 compares the values of the outer products val4 and val5 with the threshold value TH (step S24). In the present embodiment, since the coordinate of the control point Pb[k] is converted into the origin when the outer products val4 and val5 are calculated, the threshold value TH is set to zero.

In a case of val4<TH, the control point Pb[i] is positioned on the right side of the examination target line segment (vector) L[k]. In a case of val5>TH, the control point Pb[i+2] is positioned on the left side of the examination target line segment (vector) L[k]. Thus, in a case of val4<TH and val5>TH, the data examiner 521 determines that the control point Pb[i] and the control point Pb[i+2] exist on the respective sides of the examination target line segment (vector) L[k] (step S25). The existence of the control points Pb[i] and Pb[i+2] on the respective sides of the examination target line segment (vector) L[k], in other words, means that the control points Pb[i] and Pb[i+2] face each other with the examination target line segment (vector) L[k] interposed therebetween.

In a case where the control points Pb[i] and Pb[i+2] exist on the respective sides of the examination target line segment L[k], the data examiner 521 compares the values of the outer products val6 and val7 with the threshold value TH (step S26). In the present embodiment, since the coordinate of the control point Pb[i+2] is converted into the origin when the outer products val6 and val7 are calculated, the threshold value TH is set to zero.

In a case of val6<TH, the control point Pb[k] is positioned on the right side of the examination target line segment (vector) L[i]. In a case of val7>TH, the control point Pb[k+2] is positioned on the left side of the examination target line segment (vector) L[i]. Thus, in a case of val6<TH and val7>TH, the data examiner 521 determines that the control points Pb[k] and Pb[k+2] exist on the respective sides of the examination target line segment (vector) L[i] (step S27). The existence of the control points Pb[k] and Pb[k+2] on the respective sides of the examination target line segment (vector) L[i], in other words, means that the control points Pb[k] and Pb[k+2] face each other with the examination target line segment (vector) L[i] interposed therebetween.

As described above, the examination target line segment (vector) L[i] is a line segment connecting the control point Pb[i] to the control point Pb[i+2] with a straight line, and the examination target line segment (vector) L[k] is a line segment connecting the control point Pb[k] to the control point Pb[k+2] with a straight line. Accordingly, the existence of the control points Pb[i] and Pb[i+2] on the respective sides of the examination target line segment (vector) L[k] and the existence of the control points Pb[k] and Pb[k+2] on the respective sides of the examination target line segment (vector) L[i] mean that the examination target line segments (vectors) L[i] and L[k] intersect each other. Thus, the data examiner 521 determines that the examination target line segments (vectors) L[i] and L[k] intersect each other (step S28). In this case, the control points Pb[i] and Pb[k] are regarded as violation control points and the drawing data D1 fails the examination.

In a case where the condition that the control points Pb[i] and Pb[i+2] exist on the respective sides of the examination target line segment (vector) L[k] and the control points Pb[k] and Pb[k+2] exist on the respective sides of the examination target line segment (vector) L[i] is not satisfied, the data examiner 521 determines that the examination target line segments (vectors) L[i] and L[k] do not intersect each other (step S29). In this case, the control points Pb[i] and Pb[k] are regarded as passing control points.

After the intersection determination of the control points Pb[i] and Pb[k] ends as described above, the data examiner 521 sets other two control points adjacent to each other on the Bezier curve as examination target control points and performs intersection determination of the examination target control points. In this manner, each time examination target control points are set, the data examiner 521 examines intersection of examination target line segments having ends at the respective examination target control points.

In the above-described examination method as well, the data examiner 521 converts the B-spline curve into the Bezier curve when examining the drawing data D1. Thus, it is possible to perform accurate intersection determination with relaxed geometric constraints on the figure of the drawing data D1.

First Modification

A first modification of the first embodiment will be described below. The following description is mainly made on any difference from the first embodiment. In the present modification, the conversion matrix for converting the B-spline curve to the Bezier curve is different from that in the first embodiment.

The coefficients of first conversion matrices described above in the first embodiment are fractions as indicated in Expressions (1) and (2). Accordingly, when a control point Ps of the B-spline curve defined with integer coordinates is converted into a control point Pb of the Bezier curve by using the first conversion matrices, the coordinate of the control point Pb is defined with floats. In this case, an error potentially occurs through the conversion, which leads to inaccuracy in an examination result of the drawing data D1.

Thus, in the present modification, in a case where the curve order p is two, the data examiner 521 converts the coordinate of the control point Ps0, which is the figure disposition origin of the B-spline curve, into the coordinate of the control point Pb0, which is the figure disposition origin of the Bezier curve by using a second conversion matrix written in Expression (10) below.

$$Pb0 = \begin{bmatrix} 1 & 1 & 0 \\ 0 & 2 & 0 \\ 0 & 1 & 1 \end{bmatrix} Ps \qquad (10)$$

In a case where the curve order p is three, the data examiner 521 converts the coordinate of the control point Ps0 of the B-spline curve into the coordinate of the control point Pb0 of the Bezier curve by using a second conversion matrix written in Expression (11) below.

$$Pb0 = \begin{bmatrix} 1 & 4 & 1 & 0 \\ 0 & 4 & 2 & 0 \\ 0 & 2 & 4 & 0 \\ 0 & 1 & 4 & 1 \end{bmatrix} Ps0 \qquad (11)$$

The second conversion matrix defined by Expression (10) above is an integer multiple of the first conversion matrix of Expression (1) by the denominator of its coefficient, which is "2" (in this example, single multiplication of "2"). The second conversion matrix defined by Expression (11) above is an integer multiple of the first conversion matrix of Expression (2) by the denominator of its coefficient, which is "6" (in this example, single multiplication of "6").

Figure 8:
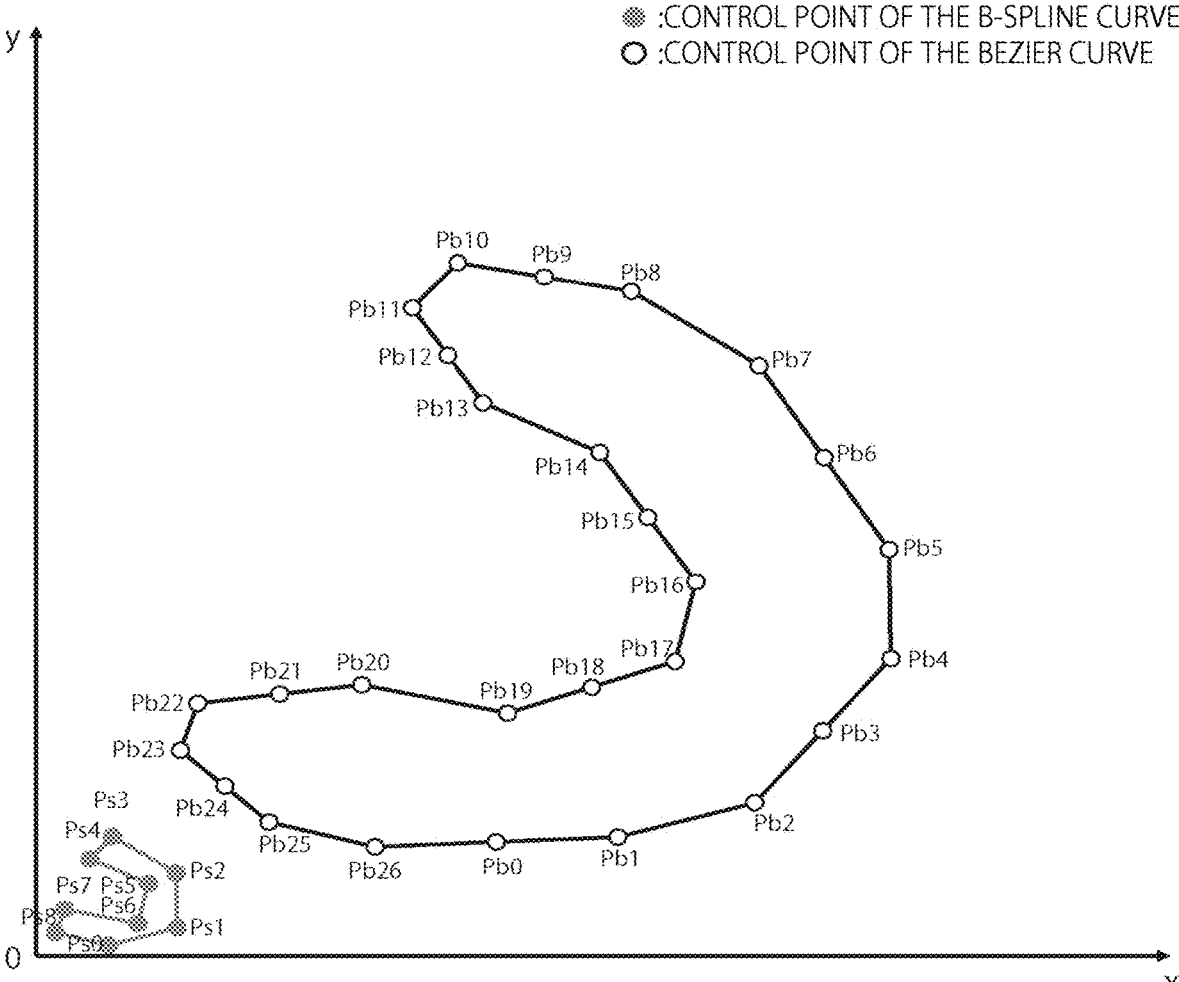
FIG. 8 is a diagram illustrating an example of control points of a B-spline curve and a Bezier curve according to a first modification.

FIG. 8 is a diagram illustrating an example of the control points of the B-spline curve and the Bezier curve according to the first modification. As illustrated in FIG. 8, the B-spline curve formed of the nine control points Ps0 to Ps8 is converted into the Bezier curve formed of the 27 control points Pb0 to Pb26 as in the first embodiment.

However, the coefficients of the second conversion matrices in the present modification are integer multiples of the coefficients of the first conversion matrices in the first embodiment by the denominators. Accordingly, the area of a figure surrounded by the control points Pb of the Bezier curve is larger than the area of a figure surrounded by the control points Ps of the B-spline curve. Moreover, with the second conversion matrices in the present modification, the control points Pb0 to Pb26 of the Bezier curve are all converted into integer coordinates by multiplying the denominators of the coefficients of the first conversion matrices in the first embodiment by integers.

In the present modification as well, the drawing data D1 is examined with the figure surrounded by the control points Pb of the Bezier curve. The method of the examination is the same as in the first embodiment and thus description thereof is omitted.

According to the present modification described above, the coordinates of the control points Pb of the Bezier curve are all defined with integers. Thus, it is possible to more accurately examine the drawing data D1 than in the first embodiment.

Second Modification

A second modification of the first embodiment will be described below. The following description is mainly made on any difference from the first embodiment. In the present modification, the configuration of the drawing data D1 is different from that in the first embodiment.

Figure 9:
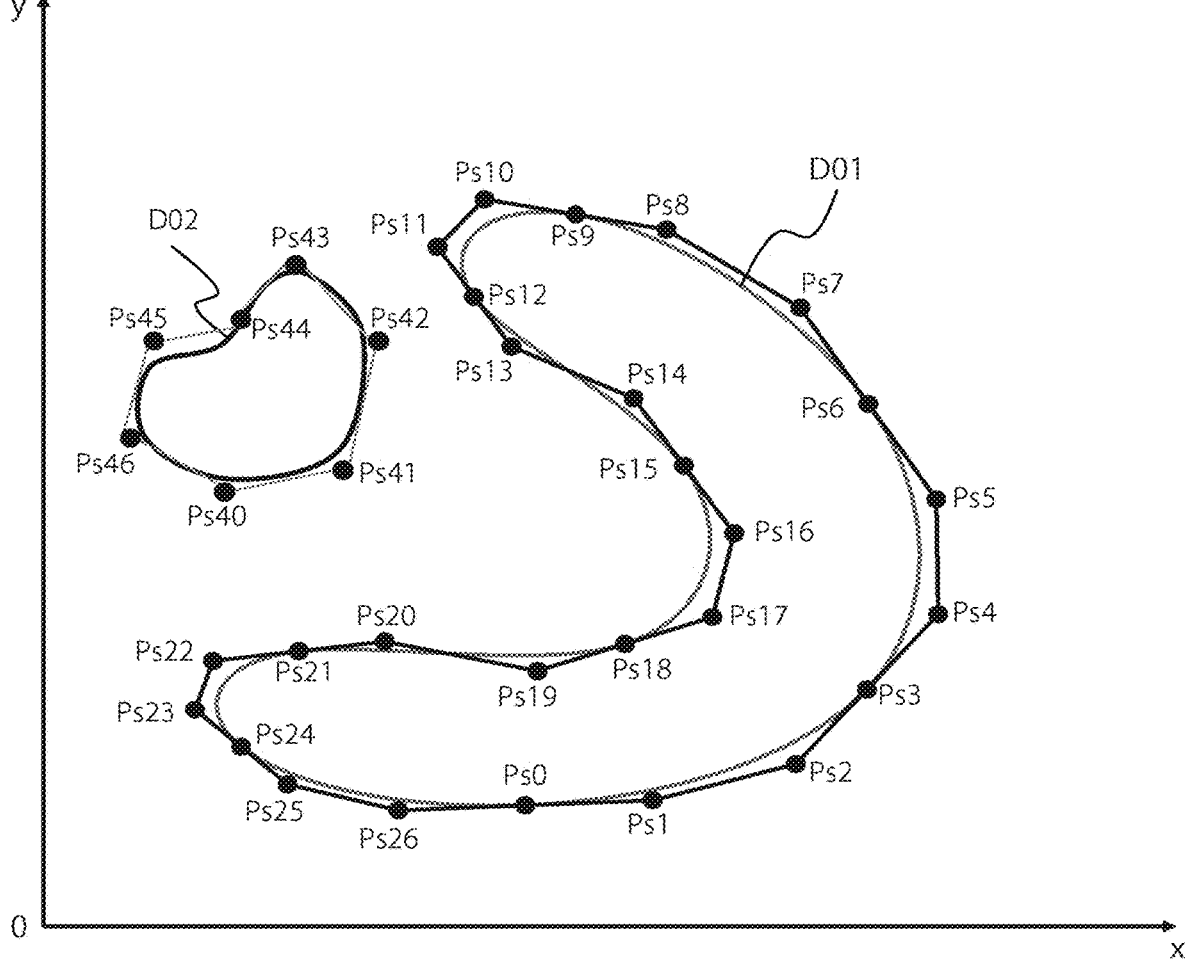
FIG. 9 is a diagram illustrating design data according to a second modification.

FIG. 9 is a diagram illustrating design data according to the second modification. In the first embodiment described above, the data examiner 521 examines the drawing data D1 of one figure.

However, in the present modification, as illustrated in FIG. 9, the drawing data D1 includes a figure that approximates design data D01 to the B-spline curve constituted by the control points Ps0 to Ps26, and a figure that approximates design data D02 to a B-spline curve constituted by control points Ps40 to Ps46. The two figures illustrated in FIG. 9 have shapes different from each other but may have identical shapes.

Figure 10:
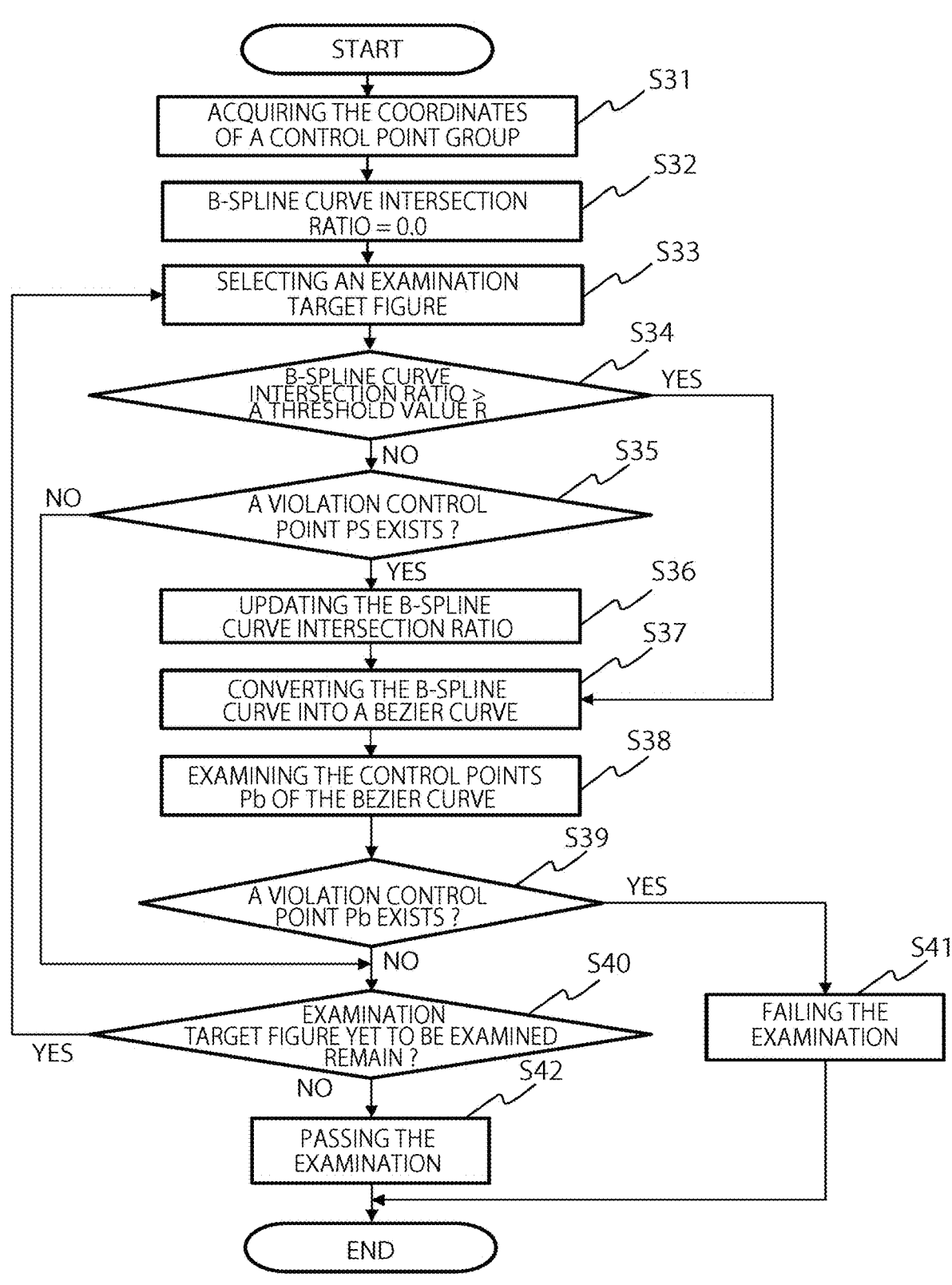
FIG. 10 is a flowchart for describing an example of the procedure of a drawing data examination method according to the second modification.

FIG. 10 is a flowchart for describing an example of the procedure of a method for examining the drawing data D1 according to the second modification. In the present modification, the drawing data D1 is produced for each level of chip, frame, block, cell, or the like. The data examiner 521 performs examination in accordance with the flowchart in FIG. 10 for each level of the drawing data D1.

In the present modification, first, the data examiner 521 acquires, from the conversion apparatus 70, the coordinates of a control point group including the control points Ps0 to Ps26 of the B-spline curve included in the drawing data D1 (step S31).

Subsequently, the data examiner 521 initializes a B-spline curve intersection ratio to 0.0 (step S32). The B-spline curve intersection ratio is the ratio of the number of figures including a B-spline curve having an intersection place relative to the total number of figures of the drawing data D1 subjected to examination. In the present modification, the data examiner 521 calculates the B-spline curve intersection ratio with an expression that divides the total number of figures of the drawing data D1 processed up to right before examination at the particular level of drawing data by the number of figures having an intersection on a B-spline curve up to right before examination at a particular level of drawing data. Figures having an intersection on a B-spline curve include a figure in which an examination target control point of a B-spline curve exists inside the examination target region and a figure in which examination target line segments having ends at respective control points adjacent to each other on a B-spline curve intersect each other.

Subsequently, the data examiner 521 selects an examination target figure from among a plurality of figures including a B-spline curve (step S33). In this example, the data examiner 521 selects, from among the figure that approximates the design data D01 to a B-spline curve and the figure that approximates the design data D02 to a B-spline curve, which are illustrated in FIG. 9, the former figure as the examination target figure.

Subsequently, the data examiner 521 determines whether the B-spline curve intersection ratio exceeds a threshold value R (step S34). The threshold value R is set to, for example, 0.5. In a case where the B-spline curve intersection ratio exceeds the threshold value R (YES at step S34), the data examiner 521 skips examination using the control points Ps of the B-spline curve and proceeds to step S37 to convert the B-spline curve into a Bezier curve as described later.

In a case where the B-spline curve intersection ratio is equal to or smaller than the threshold value R, the data examiner 521 examines the examination target figure selected at step S33. In this example, the data examiner 521 determines whether a violation control point Ps exists among the plurality of control points Ps forming the B-spline curve (step S35). As described above in the first embodiment, the violation control point Ps corresponds to a control point existing in the examination target region, and control points existing at ends of respective examination target line segments intersecting each other in a case where the order of the B-spline curve is two.

In a case where the violation control point Ps exists (YES at step S35), the data examiner 521 updates the B-spline curve intersection ratio (step S36). In a case where no violation control point Ps exists, the data examiner 521 proceeds to step S40 to check whether there remains any examination target figure yet to be examined as described later.

After updating the B-spline curve intersection ratio at step S36, the data examiner 521 converts the B-spline curve into a Bezier curve (step S37). At step S37, as in the first embodiment or the first modification described above, the data examiner 521 converts the coordinate of each control point Ps of the B-spline curve into the coordinate of a control point Pb of the Bezier curve by using a conversion matrix.

Subsequently, the data examiner 521 examines the plurality of control points Pb forming the Bezier curve (step S38). At this step, as described above in the first embodiment, the data examiner 521 determines whether an examination target control point exists inside the examination target region. In a case where the curve order is two, the data examiner 521 may determine whether examination target line segments intersect each other.

As a result of the examination, the data examiner 521 determines whether a violation control point Pb exists among the control points Pb of the Bezier curve (step S39). As described above in the first embodiment, the violation control point Pb corresponds to a control point existing in the examination target region, and control points existing at ends of respective examination target line segments intersecting each other in a case where the order of the Bezier curve is two.

In a case where no violation control point Pb exist among the control points Pb of the Bezier curve (NO at step S39), the data examiner 521 checks whether there remains any examination target figure yet to be examined as described later (step S40). In a case where there remains any examination target figure yet to be examined (YES at step S40), the data examiner 521 returns to step S33 described above. In this case, the figure that approximates the design data D02 to a B-spline curve is selected as an examination target figure and the above-described operation at steps S34 to S39 is repeated.

In a case where the violation control point Pb exists among the control points Pb of the Bezier curve (YES at step S39), the data examiner 521 determines that the drawing data D1 fails the examination (step S41). In a case where no violation control point Pb exists as a result of examination of all examination target figures (NO at step S40), the data examiner 521 determines that the drawing data D1 passes the examination (step S42).

In the present modification described above, in a case where the B-spline curve intersection ratio exceeds the threshold value R, the data examiner 521 skips examination of the control points Ps of the B-spline curve and examines the control points Pb of the Bezier curve. In a case where the B-spline curve intersection ratio is equal to or smaller than the threshold value R, the data examiner 521 performs examination of the control points Ps of the B-spline curve because examination accuracy can be ensured with the B-spline curve. In a case where no violation control point is found as a result of examination, the data examiner 521 skips examination of the control points Pb of the Bezier curve.

As described above, examination based on the B-spline curve and examination based on the Bezier curve are switched in accordance with the B-spline curve intersection ratio. Accordingly, examination time is significantly reduced as compared to a case where both examinations of the B-spline curve and the Bezier curve are performed each time. Thus, the drawing data D1 can be examined at high speed.

Second Embodiment

Figure 11:
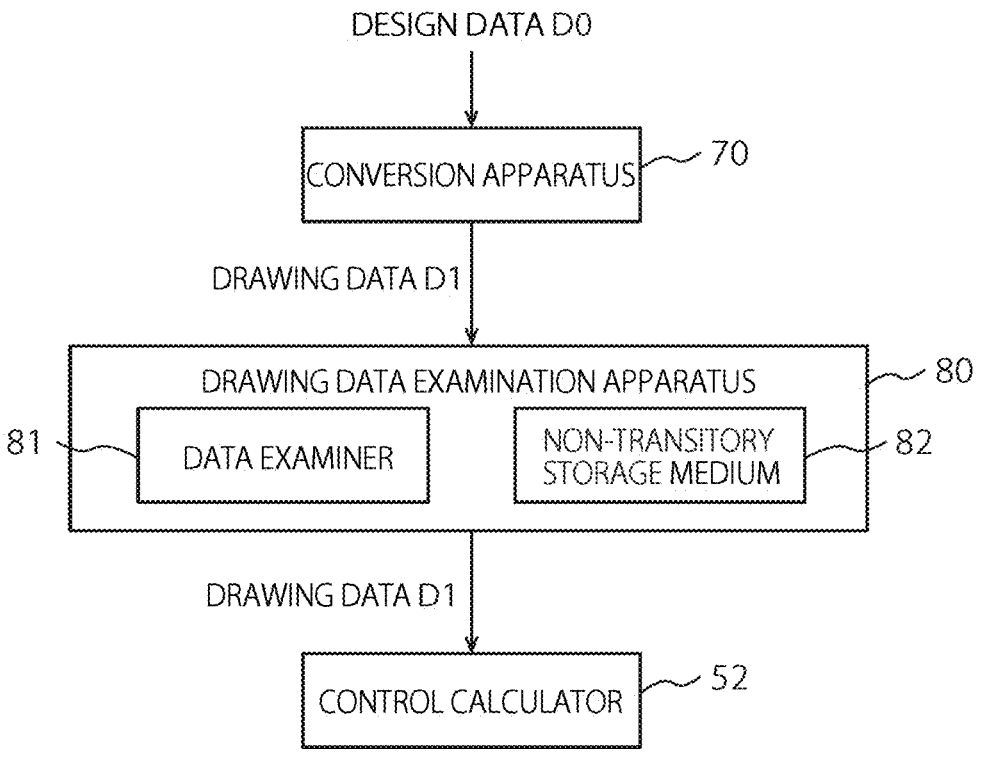
FIG. 11 is a block diagram illustrating a schematic configuration of a drawing data examination apparatus according to a second embodiment.

FIG. 11 is a block diagram illustrating a schematic configuration of a drawing data examination apparatus according to a second embodiment. In the present embodiment, the drawing data D1 generated by the conversion apparatus 70 according to the first embodiment described above is input to a drawing data examination apparatus 80.

As illustrated in FIG. 11, the drawing data examination apparatus 80 includes a data examiner 81 and a non-transitory storage medium 82. The data examiner 81 has the same function as the data examiner 521 described above in any of the first embodiment, the first modification, and the second modification. Specifically, the present embodiment has a configuration in which the function of the data examiner 521 in the control calculator 52 of the drawing apparatus 1 according to the first embodiment is relocated at the drawing data examination apparatus 80 independent from the drawing apparatus 1. The non-transitory storage medium 82 stores a computer program that implements processing performed at the data examiner 81.

As in the first embodiment and the modifications, for example, the data examiner 81 converts a B-spline curve into a Bezier curve in accordance with the B-spline curve intersection ratio and then examines whether an examination target control point or an examination target apex exists inside the examination target region with straight lines connecting three or more control points of the drawing data D1. In a case where the order of the Bezier curve is two, it may be determined whether examination target line segments having respective ends at two control points adjacent to each other on the Bezier curve intersect each other.

After the drawing data D1 passes the examination by the data examiner 81, the drawing data D1 is input to the control calculator 52. Thereafter, the drawing apparatus 1 emits a charged particle beam based on the drawing data D1.

According to the present embodiment described above, the data examiner 81 converts the B-spline curve into the Bezier curve when determining whether the drawing data D1 passes examination. Thus, it is possible to accurately examine drawing data with relaxed constraints on the shape of a curved figure included in the drawing data D1.

In the present embodiment, the conversion apparatus 70 may be provided in the drawing data examination apparatus 80. In this case, the drawing data examination apparatus 80 includes a data generator and the data examiner 81, the data generator being configured to generate the drawing data D1 based on the input design data D0.

At least part of the examination function of the drawing data examination apparatus 80 described above in the present embodiment may be configured by hardware or software. In a case of the configuration by software, a computer program that implements at least part of the examination function of the drawing data examination apparatus 80 may be stored in a non-transitory storage medium such as a flexible disk or a CD-ROM and read and executed by a computer. The non-transitory storage medium is not limited to a detachable medium such as a magnetic disk or an optical disk but may be a fixed non-transitory storage medium such as a hard disk device or a memory.

The computer program that implements at least part of the examination function of the drawing data examination apparatus 80 may be distributed through a communication line (including wireless communication) such as the Internet. Moreover, the computer program may be encrypted, modulated, or compressed and then may be distributed in this state through a wired or wireless line such as the Internet or storage in a non-transitory storage medium.

The present invention is not limited to the above-described embodiments but may be embodied with modified constituent components without departing from the scope thereof when performed. Various kinds of inventions may be formed by appropriate combination of a plurality of constituent components disclosed in the above-described embodiments. For example, some constituent components may be deleted from among all constituent components presented in an embodiment. Moreover, constituent components in different embodiments may be combined as appropriate.

The invention claimed is:

1. A drawing data examination method for examining drawing data being used in a charged particle beam drawing apparatus, by a computer, the drawing data expressing a plurality of drawing figures by a B-spline curve connecting a plurality of first control points with line segments, the coordinate positions of the first control points are set in a two-dimensional coordinate system for each of the plurality of the drawing figures, the drawing data examination method comprising:

acquiring coordinate positions of the plurality of the first control points in a two-dimensional coordinate system;

calculating a B-spline curve intersection ratio indicating a ratio of the number of the drawing figures expressed by a B-spline curve having an intersection place relative to the total number of the drawing figures to be examined;

converting the coordinate positions of the plurality of the first control points into coordinate positions of a plurality of second control points of a Bezier curve using a predetermined conversion matrix in a case where the B-spline curve intersection ratio exceeds a threshold value and determining whether the drawing figures expressed by the Bezier curve have an intersection; and determining whether the drawing figures expressed by the B-spline curve have an intersection based on the plurality of the first control points in a case where the B-spline curve intersection ratio is equal to or smaller than the threshold value, and converting the coordinates positions of the first control points into the coordinate positions of the second control points using a predetermined conversion matrix in a case where the drawing figures have an intersection and determining whether the drawing figures expressed by the Bezier curve have an intersection.

2. The drawing data examination method according to claim 1, wherein a first conversion matrix has a coefficient of a fraction and the coordinates of the first control point group are converted into the coordinates of the second control point group by using a second conversion matrix that is an integer multiple of the first conversion matrix corresponding to the denominator of the fraction of the coefficient.

3. A drawing method of emitting a charged particle beam based on drawing data examined by the drawing data examination method according to claim 1.

4. A drawing apparatus comprising:
   processing circuitry configured to:
      examine drawing data expressing a plurality of drawing figures by a B-spline curve connecting a plurality of first control points with line segments, the positions of the first control points are set in a two-dimensional coordinate system for each of the plurality of the drawing figures;
      acquire coordinate positions of the plurality of the first control points in a two-dimensional coordinate system;
      calculate a B-spline curve intersection ratio indicating a ratio of the number of the drawing figures expressed by a B-spline curve having an intersection place relative to the total number of the drawing figures to be examined;
      convert the coordinate positions of the plurality of the first control points into coordinate positions of a plurality of second control points of a Bezier curve using a predetermined conversion matrix in a case where the B-spline curve intersection ratio exceeds a threshold value, and determine whether the drawing figures expressed by the Bezier curve have an intersection; and
      determine whether the drawing figures expressed by the B-spline curve have has an intersection based on the plurality of the first control points in a case where the B-spline curve intersection ratio is equal to or smaller than the threshold value, and convert the coordinate positions of the first control points into the coordinate positions of the second control points using a predetermined conversion matrix in a case where the drawing figures have an intersection and determine whether the figures expressed by the Bezier curve have an intersection.

5. A non-transitory storage medium storing a computer program for causing a computer to execute:
   processing of acquiring coordinate positions of a plurality of first control points in a two-dimensional coordinate system forming a B-spline curve connecting the plurality of first control points with line segments and expressing a plurality of drawing figures of drawing data used by a charged particle beam drawing apparatus;
   processing of calculating a B-spline curve intersection ratio indicating a ratio of the number of the drawing figures expressed by a B-spline curve having an intersection place relative to the total number of the drawing figures to be examined;
   processing of converting the coordinates positions of the plurality of the first control points into coordinate positions of a plurality of second control points of a Bezier curve using a predetermined conversion matrix in a case where the B-spline curve intersection ratio exceeds a threshold value, and determining whether the drawing figures expressed by the Bezier curve have an intersection, and determining whether the drawing figures have an intersection based on the plurality of the first control points in a case where the B-spline curve intersection ratio is equal to or smaller than the threshold value; and
   processing of determining whether the drawing figures expressed by the B-spline curve have an intersection based on the plurality of the first control points in a case where the B-spline curve intersection ratio is equal to or smaller than the threshold value, and converting the coordinate positions of the first control points into the coordinate positions of the second control points using a predetermined conversion matrix in a case where the drawing figures have an intersection and determining whether the drawing figures expressed by the Bezier curve have an intersection.

* * * * *